(12) United States Patent
Koo et al.

(10) Patent No.: US 7,068,627 B2
(45) Date of Patent: Jun. 27, 2006

(54) DEVICE AND METHOD FOR TRANSMITTING DATA WITH DIFFERENT QUALITIES IN MOBILE COMMUNICATION SYSTEM

(75) Inventors: Chang-Hol Koo, Songnam-shi (KR); Min-Koo Kim, Suwon-shi (KR); Dae-Gyun Kim, Songnam-shi (KR); Dong-Seek Park, Suwon-shi (KR)

(73) Assignee: Samsung electronics Co., Ltd. (KR)

( * ) Notice: Subject to any disclaimer, the term of this patent is extended or adjusted under 35 U.S.C. 154(b) by 998 days.

(21) Appl. No.: 09/999,228

(22) Filed: Oct. 19, 2001

(65) Prior Publication Data
US 2002/0075897 A1   Jun. 20, 2002

(30) Foreign Application Priority Data
Oct. 19, 2000  (KR)  ............................... 2000-61720
Oct. 21, 2000  (KR)  ............................... 2000-62150

(51) Int. Cl.
*H04Q 7/00* (2006.01)
(52) U.S. Cl. ................... 370/333; 370/335; 370/522
(58) Field of Classification Search ............. 370/335, 370/342, 468, 235, 252, 338, 522, 524, 469; 455/452.1, 452.2
See application file for complete search history.

(56) References Cited

U.S. PATENT DOCUMENTS

| | | | |
|---|---|---|---|
| 6,477,670 B1 * | 11/2002 | Ahmadvand ................ 714/712 |
| 6,501,748 B1 * | 12/2002 | Belaiche ..................... 370/342 |
| 6,542,490 B1 * | 4/2003 | Ahmadvand et al. ....... 370/338 |
| 6,728,218 B1 * | 4/2004 | Corke et al. ................ 370/252 |
| 6,744,744 B1 * | 6/2004 | Tong et al. ................. 370/320 |
| 6,751,772 B1 * | 6/2004 | Kim et al. .................. 714/786 |
| 6,765,909 B1 * | 7/2004 | Sen et al. ................... 370/392 |
| 6,788,657 B1 * | 9/2004 | Freiberg et al. ............ 370/328 |
| 6,850,508 B1 * | 2/2005 | Chang et al. ............... 370/335 |
| 2002/0001296 A1 * | 1/2002 | Lee et al. ................... 370/338 |
| 2002/0054578 A1 * | 5/2002 | Zhang et al. ............... 370/328 |
| 2003/0133408 A1 * | 7/2003 | Cheng et al. ............... 370/230 |
| 2004/0125765 A1 * | 7/2004 | Yun et al. ................... 370/328 |

OTHER PUBLICATIONS

TIA/EIA/IS-2000A, CDMA2000 Series, Mar. 2000, p1-9.*

* cited by examiner

*Primary Examiner*—Chieh M. Fan
*Assistant Examiner*—Warner Wong
(74) *Attorney, Agent, or Firm*—Dilworth & Barrese, LLP (57) ABSTRACT

There is provided a device and method for transmitting data with different QoSs in a mobile communication system. To transmit the data with different QoSs, an RLP layer divides the data into datagrams according to the QoSs, a MUX layer multiplexes the datagrams received from the RLP layer and outputs multiplexed TU data, a plurality of QCCHs for receiving the multiplexed TU data and outputs TU blocks with the QoSs by puncturing and repeating information added according to the QoSs for the multiplexed TU data, and an MQC maps the TU blocks received on the QCCHs according to the QoSs.

16 Claims, 7 Drawing Sheets

DEVICE AND METHOD FOR TRANSMITTING DATA WITH DIFFERENT QUALITIES IN MOBILE COMMUNICATION SYSTEM

PRIORITY

This application claims priority to an application entitled "Device and Method for Transmitting Data with Different Qualities in Mobile Communication System" filed in the Korean Industrial Property Office on Oct. 19, 2000 and assigned Serial No. 2000-61720, and an application entitled "Device and Method for Transmitting Data with Different Qualities in Mobile Communication System" filed in the Korean Industrial Property Office on Oct. 21, 2000 and assigned Serial No. 2000-62150, the contents of both of which are hereby incorporated by reference.

BACKGROUND OF THE INVENTION

1. Field of the Invention

The present invention relates generally to a data service providing device and method in a mobile communication system, and in particular, to a device and method for providing a data service with different QoSs (Qualities of Service) in a mobile communication system.

2. Description of the Related Art

Various technic have been proposed for IS-2000 to provide a data service in mobile communication systems. Those mobile communication systems should transmit high rate data with a high throughput in many cases. The operations of layers including the RLP (Radio Link Protocol) layer, the MUX (Multiplexing) layer, and the physical layer are critical to radio protocols offering a high throughput. Also, interface matching must be provided between the layers and an information flow based on the interface matching becomes a significant factor to increasing the throughput.

Meanwhile, since data transmitted on the same physical channel has the same QoS level, when different media data types are transmitted, a different QoS cannot be provided for each media data type. Thus, it can be said that the mobile communication systems are not suitable for multimedia service.

In the case of an HDR system, for example, the system transmits/receives multiple inputs. Because the HDR system has been developed basically for non-real time service, it has defined physical layer, scheduling, signaling, etc. to provide a non-real time data service at a high data rate to users within a cell. If a variety of services such as an Internet data service, a voice service and a multimedia service are to be provided concurrently, the HDR system has limitations in processing and transmitting data according to the different QoSs of the services.

SUMMARY OF THE INVENTION

An object of the present invention is, therefore, to provide a device and method for implementing protocols by which a multimedia service with different QoSs can be provided in a mobile communication system.

Another object of the present invention is to provide a device and method for providing a multimedia data service with different QoSs with a high throughput in a mobile communication system.

The foregoing and other objects of the present invention can be achieved by providing a device and method for transmitting data with different QoSs in a mobile communication system. To transmit the data with different QoSs, an RLP layer divides the data into datagrams according to the QoSs, a MUX layer multiplexes the datagrams received from the RLP layer and outputs multiplexed TU (Transport Unit) data, a plurality of QCCHs for receiving the multiplexed TU data and outputs TU blocks with the QoSs by puncturing and repeating information added according to the QoSs for the multiplexed TU data, and an MQC maps the TU blocks received on the QCCHs according to the QoSs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
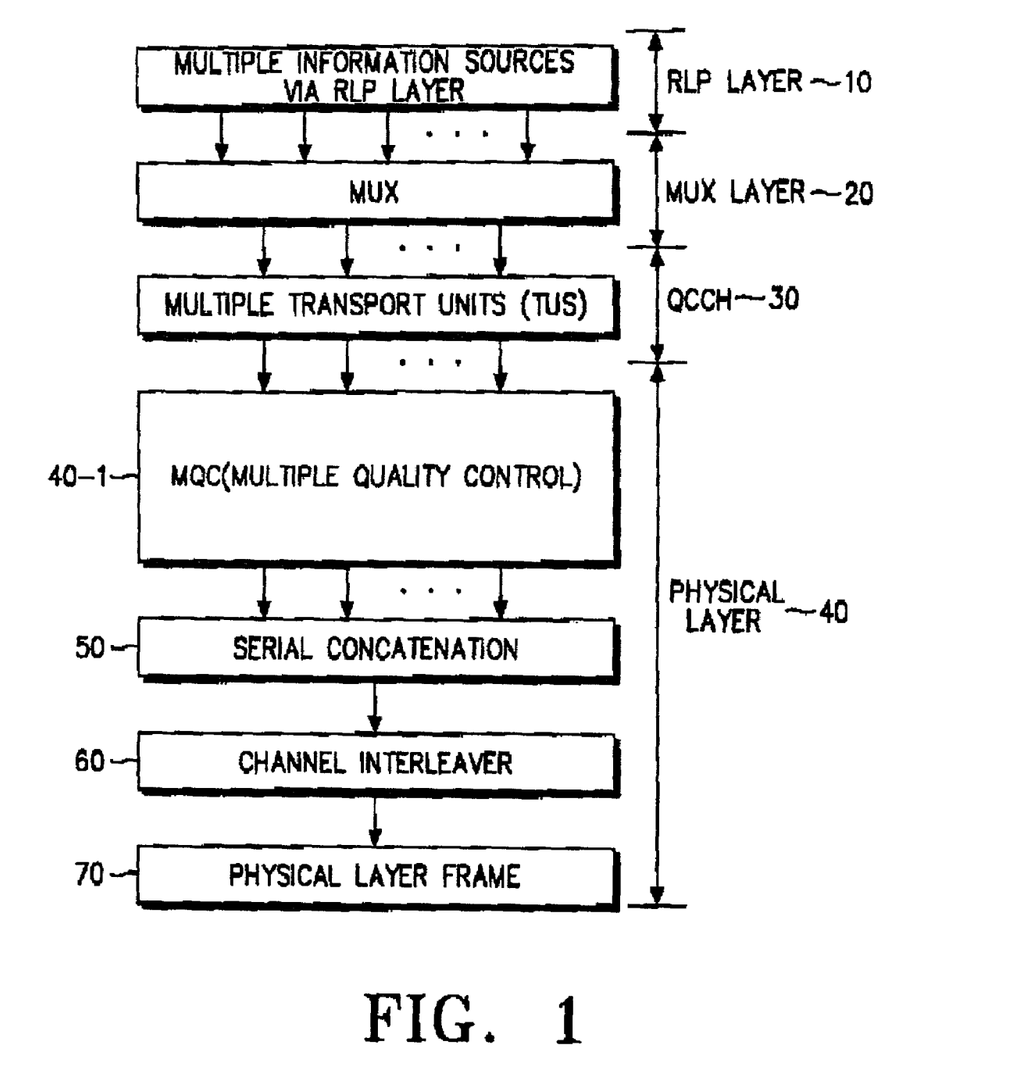
FIG. 1 is a block diagram of a protocol structure for application to a device for transmitting data with different QoSs according to an embodiment of the present invention.

FIG. 1 is a block diagram illustrating a protocol structure for application to a device for transmitting multimedia data with different QoSs according to an embodiment of the present invention.

Referring to FIG. 1, the protocol structure is composed of an RLP layer 10, a MUX layer 20, and a physical layer having an MQC (Multiple Quality Control) 40, and interfacing function blocks 50, 60 and 70.

The protocol structure is designed to provide different QoSs to transmission data via QCCHs (Quality Control Channels) 30. This protocol structure represents a general user plane for transmission of pure user information, that is, no control information is transmit. From a control plane's perspective, logical channels proposed according to the present invention are mapped to specific control channels and the QCCHs 30 are mapped on a 1:1 basis to logical channels. The description of the present invention will be confined to the user plane, while each function block is still applicable to the control plane.

The RLP layer 10 processes logical channels that are determined according to the classes of application service streams. That is, the RLP layer 10 can constitute a plurality of logical channels according to the classes of application services, for example, voice service, moving picture service, or Internet data service. Also, the RLP layer 10 determines the number of RLP instances according to the types of input data and the number of the logical channels, and produces as many RLP instances as the determined number. The relationship between an RLP instance and services can be defined in three ways: one RLP instance can be configured to accommodate only one service; one RLP instance can accommodate a plurality of same-type services; or, one RLP instance can accommodate a plurality of services irrespective of service types. When an independent RLP instance is assigned to each service, the number of RLP instances generated is equal to the number of classified logical channels. Here, an RLP controls management of the sequence number of data transmitted on each logical channel and data segmentation. On the other hand, when one RLP manages a plurality of logical channels, a different RLP function is required because the logical channels must be managed not individually but collectively.

In the embodiment of the present invention, an independent RLP is provided for each logical channel, by way of example.

It is assumed herein that a datagrams is determined for transmission data on a logical channel according to the source data rate of the application service. The length of the datagrams can be less than or equal to a TU(Transport Unit) length for a QCCH 30 in length. The RLP also transmits information about the type of the transmission data on the logical channel. The resulting data is transmitted to the MUX layer 20.

The MUX layer 20 functions to map the data between the logical channels and the QCCHs 30. The datagram received on the logical channels in the MUX layer 20 is processed as follows for mapping to the QCCHs 30.

(1) Multiplexing functionality. If the length of the datagram received on a logical channel is less than the TU length for the QCCHs 30, the datagram is assembled with data received on another logical channel to build a data unit of a fixed length.

(2) Switching functionality. If the length of the datagram received on a logical channel is equal to the TU length for the QCCHs 30, the datagram is switched without assembly with another logical channel data to a particular QCCH 30. Another function of the switching is to map the datagram of logical channels with the same or similar QoSs to a QCCH 30 with a particular QoS, so that the datagram received on the logical channels can be appropriately distributed to always activate the QCCHs 30.

(3) QoS control functionality. The datagram received on a logical channel is mapped to a QCCH 30 according to its priority, which can be determined according to the characteristics of the logical channel. The QoS control functionality applies to the case where control information is transmitted along with data information, or signaling information containing system information is transmitted with other data information.

Data generated from the RLP layer 10 is transmitted on a QCCH 30 to the MQC 40 via the MUX layer 20. A plurality of QCCHs 30 may exist. Therefore, a different QoS can be ensured for each QCCH 30 according to an internal function block in the MQC 40. A TU on a QCCH 30 can be different in length depending on whether it is transmitted in a forward or reverse direction. The TU length can be fixed or variable regardless of a forward or reverse direction. Or, the TU length can have a fixed length for the forward direction and a variable length for the reverse direction, or vice versa. The number of TUs can be different for the forward direction and the reverse direction. These value are system implementation-dependent or service convenience-dependent.

Each function block in the MQC 40 provides a different control to a TU with a different QoS mapped via the MUX layer 20 according to the QoS. A quality (or QoS) matcher (QM) in the MQC 40 assigns a different value to each TU according to its effective, QoS. The assigned value determines the QoS of the QCCH 30. If a fixed QM value is used, TUs transmitted on the same QCCH 30 have the same QoS. If a dynamic QM value is used, different QoSs can be applied to a QCCH 30. The MQC 40 provides a different QoS to each data received on the QCCH 30, which will be later described referring to FIG. 2.

A serial concatenator 50 serially concatenates TUs with different QoSs received on a plurality of QCCHs 30. The serial concatenator 50 matches the TUs to an interleaver size by constructing a physical layer packet (PLP) of the interleaver size with the TUs.

A channel interleaver 60 interleaves the serially concatenated TUs for transmission on a physical channel. The channel interleaver 60 performs symbol pruning in addition to the interleaving function provided by a typical mobile communication system. The channel interleaver 60 prunes TUs if the total size of the serially concatenated TUs exceeds an acceptable size. The resulting physical layer frame 70 is mapped to slots as shown in FIG. 2 prior to transmission to a receiver.

Figure 2:
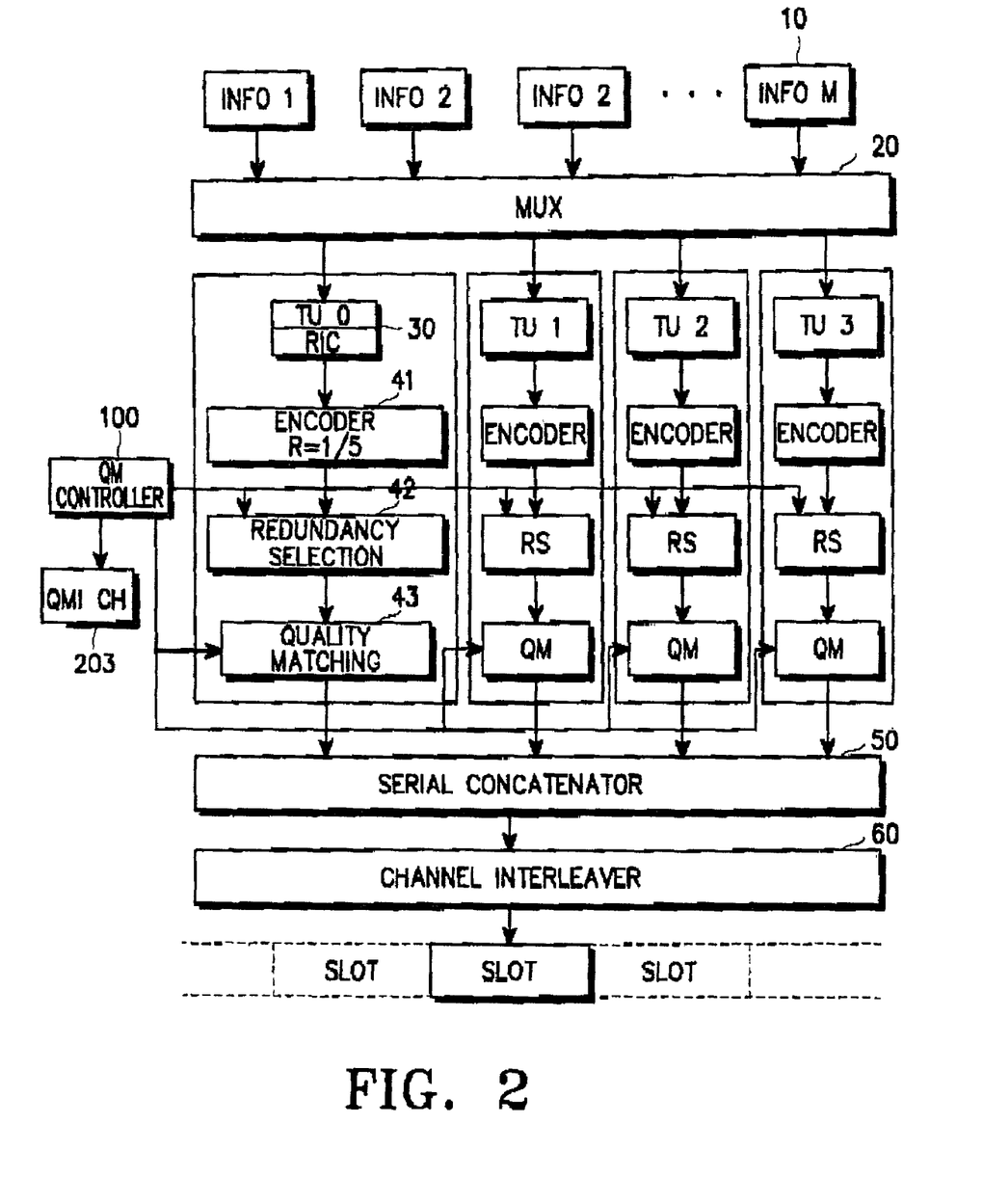
FIG. 2 is a detailed block diagram of a multiple quality controller (MQC) and an RLP layer shown in FIG. 1.

FIG. 2 is a detailed block diagram of the RLP layer 10 and the MQC 40 shown in FIG. 1, referred to for describing processing TUs on the QCCH 30 before they are output to the serial concatenator 50.

The MUX layer 20 receives data info 1, info 2, info 3, . . . , info M from the RLP layer 10 and processes the received datagram based on the QoS requirements of their application services according to the above-described functionalities. As stated before, one RLP layer 10 can provide an independent control for each data class info 1, info 2, info 3, . . . , info M, or can provide overall control to the data stream.

The MUX layer 20 outputs each TU (TU0, TU1, TU2, and TU3) with a CRC (Cyclic Redundancy Code). The length of the CRC is determined by the length or characteristics of the TU. Especially when no data is generated from the MUX layer 20, a CRC itself can serve as one TU. The CRC attached to each TU can be used as a retransmission unit according to a transmission scheme, that is, ARQ (Automatic Repeat Request) in a lower layer. A detailed description of a TU-basis retransmission and ARQ will be avoided here as it will become apparent to those skilled in the art.

Encoders 41 receive TUs on different QCCHs 30. The encoders 41 are turbo encoders or convolutional encoders, for example. In FIG. 2, turbo encoders are used for illustrative purposes. Each encoder 41 encodes an input TU with a code rate which can be different for each different TU. Alternatively, the same code rate can be applied to all the TUs received on the QCCHs 30. In the case of retransmission by HARQ (Hybrid ARQ), an initial code rate can be different from a code rate for retransmission of data that contains errors. In the embodiment of the present invention, the code rate of the turbo encoders 41 is ⅕ applied to all TUs.

A redundancy selector (RS) 42 carries out redundancy selection, which is a link transmission scheme useful to HARQ Type II/III. That is, a different redundancy matrix (i.e., a different complementary code) is used for retransmission to increase the combining performance of a receiver. Retransmission is available on a TU basis in the present invention.

The QM 43 provides a different QoS to each TU by controlling a required QoS matching value (QM value) through puncturing and repetition. The QM value can be fixed when a channel is established between a base station and a mobile station, if the channel is static. On the other hand, if a channel is dynamically set up, the QM value is variable and reported to the receiver on a control channel each time a TU is transmitted. The QM value is relative between the QCCHs 30 irrespective of whether it is fixed or variable. Therefore, the QM value is a significant parameter by which a different QoS is set for each QCCH 30 according to the characteristics of its application service. The TUs output from the QM 43 assume different characteristics and formats from when they are input to the QCCHs 30.

A QM controller 100 and a QMI (Quality Matching Index) channel 203 are provided to control the redundancy selector 41 and the QM 43. The QM controller 100 includes a quality index look-up table having different QM sets according to application services and cell states, each QM set having QoS indexes according to information source and changes in the data rate of a physical channel.

The QM controller 100 determines QM sets by service negotiation and other applicable procedures and applies the determined QM sets.

The QM controller 100 checks the number of information sources and changes in the data rate of the physical channel in applying the determined QM sets and selects an appropriate QM set from the QM sets. The determination of the QM value will be described later with reference to FIG. 3.

The QM controller 100 transmits the determined QM value to a forward link receiver on the QMI channel 203. The forward receiver generates a weight in a decoder based on the QM value and performs de-QoS matching with the weight to thereby produce code symbols of the same size.

The QM controller 100 also provides a weight for a QM set to the QM 43 for each QCCH 30. The QM 43 applies a corresponding weight to data.

The serial concatenator 50 serially concatenates the TUs received from the QM 43. The serially concatenated TUs are then channel-interleaved in the channel interleaver 60, and are mapped to transmission slots of a physical channel and transmitted to the receiver. The number of TUs per slot on the physical channel is determined according to the data rate of the physical channel.

The QM controller 100 applies selective redundancy to an input data stream X at initial transmission. Redundancy volume is determined according to the priority of an input data stream and a change in the data rate, alone or in combination.

A description will be made on selection of redundancy volume according to the priority level of an input data stream. The QM controller 100 determines redundancy volumes according to the priority levels of input information sources (data streams) at a given data rate and transmits the redundancy, volume information to the QMs 43. That is, the QM controller 100 assigns large redundancy volumes to high-priority services, high-priority media, and particular syntax groups.

With regard to determination of redundancy volume according to data types. First, for a multimedia service having audio data, video data and control data in combination, since audio distortion is more annoying to human perception than video distortion, a higher redundancy level is set for the audio data than for the video data. A relatively high redundancy level is also applied to the control data because it requires high stability. When the video data is composed of the syntax groups of a header, a motion vector, and a transform coefficient, redundancy is set in a descending order of priority, for example, in the order of header, motion vector, and transform coefficient, or in the order of header, motion vector and transform coefficient, or in the order of motion vector, header and transform coefficient. Second, when a real time data service and a non-real time data service occur concurrently, a relatively high redundancy level is set for a source data stream for the real time data service.

A description will now be made on selection of redundancy volume according to the data rate. At a lower data rate, the QM controller applies a lower redundancy level to all input data streams, or a much lower redundancy level especially to input data streams with lower priority levels.

With regard to determination of redundancy volume according to the priority levels of input data streams and the data rate, the QM controller 100 can involve the factors of input data stream priority, initial transmission/retransmission, and data rate changes in selecting redundancy volume. Based on statistical information about all such conditions, the QM controller 100 can construct a look-up table of QM value. Alternatively, the QM controller 100 can select redundancy volume arbitrarily. The QM value for each TU is reported to the receiver.

For example, QM value mapping values can be listed in the tables shown below based on input data stream priority, initial transmission/retransmission, and data rate changes. Table 1 is a QoS mapping table for initial transmission and Table 2 is a QoS mapping table for each case shown in Table 1 for initial transmission.

TABLE 1

|   |       | RLP1 | RLP2 | RLP3 | RLP4 | Number of TUs | Number of Info Sources |
|---|-------|------|------|------|------|---------------|------------------------|
| 1 | 00000 | RLP1 |      |      |      | 1TU           | 1RLP                   |
| 2 | 00001 | RLP1 | RLP1 |      |      | 2TU           |                        |
| 3 | 00010 | RLP1 | RLP1 | RLP1 |      | 3TU           |                        |
| 4 | 00011 | RLP1 | RLP1 | RLP1 | RLP1 | 4TU           |                        |
| 5 | 00100 | RLP1 |      |      |      | 1TU           | 2RLP                   |
| 6 | 00101 | RLP1 | RLP2 |      |      | 2TU           |                        |
| 7 | 00110 | RLP1 | RLP2 | RLP1 |      | 3TU           |                        |
| 8 | 00111 | RLP1 | RLP2 | RLP2 |      | 3TU           |                        |
| 9 | 01000 | RLP1 | RLP2 | RLP1 | RLP1 | 4TU           |                        |
| 10 | 01001 | RLP1 | RIP2 | RLP2 | RLP2 |              |                        |
| 11 | 01010 | RLP1 | RLP2 | RLP1 | RLP2 |              |                        |
| 12 | 01011 | RLP1 |      |      |      | 1TU           | 3RLP                   |
| 13 | 01100 | RLP1 | RLP2 |      |      | 2TU           |                        |
| 14 | 01101 | RLP1 | RLP2 | RLP3 |      | 3TU           |                        |
| 15 | 01110 | RLP1 | RLP2 | RLP3 | RLP1 | 4TU           |                        |
| 16 | 01111 | RLP1 | RLP2 | RLP3 | RLP2 |              |                        |
| 17 | 10000 | RLP1 | RLP2 | RLP3 | RLP3 |              |                        |
| 18 | 10001 | RLP1 | RLP2 | RLP3 | RLP4 | 4TU           | 4RLP                   |

TABLE 2

|   | RMI | $RM_{TU1}$ | $RM_{TU2}$ | $RM_{TU3}$ | $RM_{TU4}$ | Number of TUs | Number of Info Sources |
|---|-----|------|------|------|------|-----|------|
| 1 | 00000 | 1.0 |     |     |     | 1TU | 1RLP |
| 2 | 00001 | 1.0 | 1.0 |     |     | 2TU |      |
| 3 | 00010 | 1.0 | 1.0 | 1.0 |     | 3TU |      |
| 4 | 00011 | 1.0 | 1.0 | 1.0 | 1.0 | 4TU |      |
| 5 | 00100 | 1.0 |     |     |     | 1TU | 2RLP |
| 6 | 00101 | 1.2 | 0.8 |     |     | 2TU |      |
| 7 | 00110 | 1.2 | 0.6 | 1.2 |     | 3TU |      |
| 8 | 00111 | 1.2 | 0.9 | 0.9 |     | 3TU |      |
| 9 | 01000 | 1.3 | 0.9 | 0.9 | 0.9 | 4TU |      |
| 10 | 01001 | 1.1 | 0.7 | 1.1 | 1.1 |    |      |
| 11 | 01010 | 1.2 | 0.8 | 1.2 | 0.8 |    |      |
| 12 | 01011 | 1.0 |     |     |     | 1TU | 3RLP |
| 13 | 01100 | 1.2 | 0.8 |     |     | 2TU |      |
| 14 | 01101 | 1.2 | 1.0 | 0.8 |     | 3TU |      |
| 15 | 01110 | 1.1 | 1.0 | 0.8 | 1.1 | 4TU |      |
| 16 | 01111 | 1.2 | 1.0 | 0.8 | 1.0 |    |      |

TABLE 2-continued

| | RMI | $RM_{TU1}$ | $RM_{TU2}$ | $RM_{TU3}$ | $RM_{TU4}$ | Number of TUs | Number of Info Sources |
|---|---|---|---|---|---|---|---|
| 17 | 10000 | 1.4 | 1.0 | 0.8 | 0.8 | | |
| 18 | 10001 | 1.2 | 1 | 1 | 0.8 | 4TU | 4RLP |

Referring to Table 1 and Table 2, QM values for initial transmission will be described.

(1) If the number of information sources is equal to the number of available channels (TUs), one information source is mapped to one channel (TU) and a QM value for each channel is determined by a QM controller 100.

(2) If the number of information sources is greater than the number of available channels (TUs), information sources with higher priority levels are first mapped to the channels (TUs). When multiple channels are used, a QM value for each channel is determined by the QM controller 100.

(3) If the number of information sources is less than the number of available channels (TUs), the information sources are mapped on a 1:1 basis to the channels (TUs). In the remaining channels, information sources with high priority levels are repeatedly mapped. A QM value for each channel is determined by the QM controller 100. Table 1 illustrates a general rule for the above three cases and Table 2 illustrates an example of a QM parameter for each case shown in Table 1.

When an error is detected from data transmitted with QM value shown in Table 1 and Table 2 and the data is to be retransmitted, a QoS mapping table for retransmission such as Table 3 is referred to.

TABLE 3

| | RMI | $RM_{TU1}$ | $RM_{TU2}$ | $RM_{TU3}$ | $RM_{TU4}$ | Number of TUs | Number of Corrupted TUs |
|---|---|---|---|---|---|---|---|
| 1 | 00000 | TU × 1 | | | | 1TU | 1 |
| 2 | 00001 | TU × 1 | TU × 1' | | | 2TU | |
| 3 | 00010 | TU × 1 | TU × 1' | TU × 1" | | 3TU | |
| 4 | 00011 | TU × 1 | TU × 1' | TU × 1" | TU × 1''' | 4TU | |
| 5 | 00100 | TU × 1 | TU × 2 | | | 2TU | 2 |
| 6 | 00101 | TU × 1 | TU × 2 | TU × 1' | | 3TU | |
| 7 | 00110 | TU × 1 | TU × 2 | TU × 1' | TU × 1" | 4TU | |
| 8 | 00111 | TU × 1 | TU × 2 | TU × 1' | TU × 2' | 4TU | |
| 9 | 01000 | TU × 1 | TU × 2 | | | 3TU | 3 |
| 10 | 01001 | TU × 1 | TU × 2 | TU × 1' | TU × 1' | 4TU | |
| 11 | 01010 | TU × 1 | TU × 2 | TU × 4 | TU × 4 | 4TU | 4 |

Application of a QoS matching process to retransmission of corrupted TUs can increase QoS and reduce the number of retransmissions simultaneously and as a result, increase a bandwidth throughput. The basic assumption for retransmission is that the number of channels (TUs) for initial transmission is still maintained irrespective of data rates. Now, a general QoS mapping rule will be given as follows.

(1) When initially transmitted TUs are all corrupted and thus must be transmitted, a new packet for each corrupted TUs is mapped to each channel (TU). Here, a QoS mapping value for each channel is 1.0 or determined in the QM controller 100.

(2) When part of initially transmitted TUs are corrupted and thus must be retransmitted, a new packet for each corrupted TU is mapped to each channel (TU). In the remaining channels, a new packet or new packets for information sources with higher priorities are mapped or all new packets are repeatedly mapped. All the QoS values are 1.0 or determined in the QM controller 100. As seen from the seventh example in Table 3, TU1 with a high priority is mapped three times or as seen from the eighth example in Table 3, all corrupted TUs are equally mapped.

Figure 3:
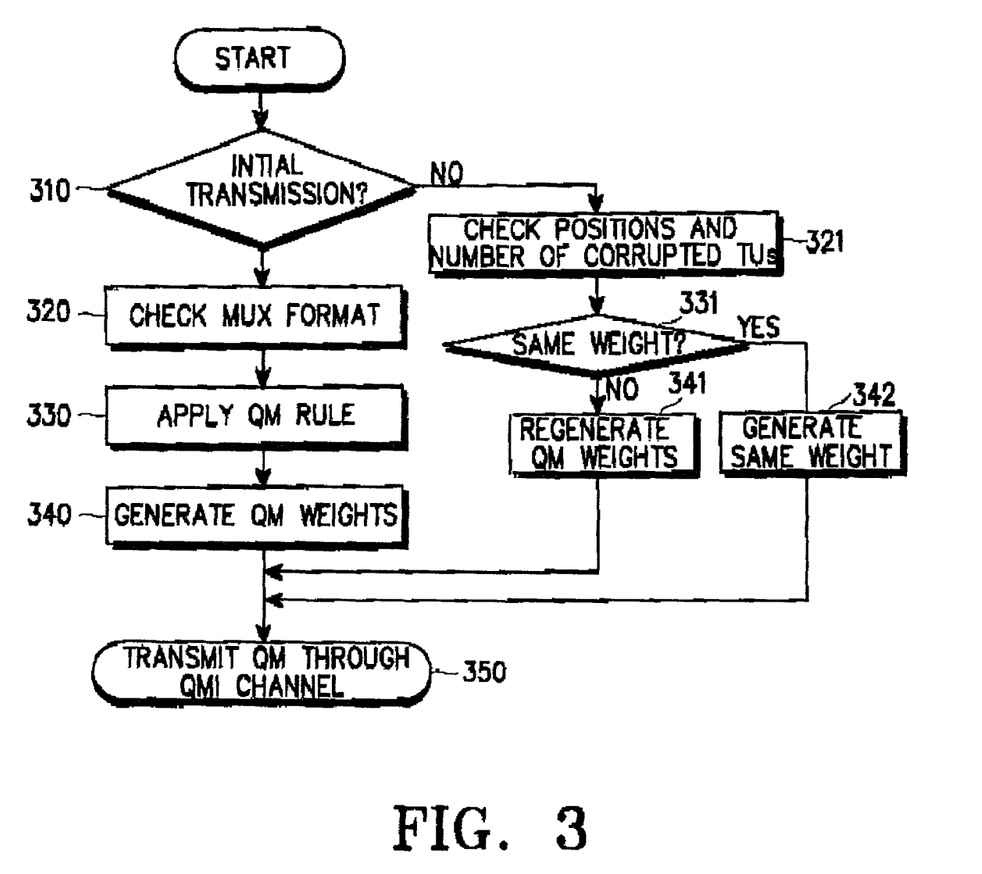
FIG. 3 is a flowchart illustrating a QM(Quality Matching) value assigning method in a forward direction according to an embodiment of the present invention.

FIG. 3 is a flowchart illustrating a QM value assigning method in a forward direction according to an embodiment of the present invention.

Referring to FIG. 3, the QM controller 100 checks whether packet data is to be initially transmitted or retransmitted in step 310. In the case of initial transmission, the QM controller 100 checks the multiplexing (MUX) format of data blocks multiplexed in the MUX layer in step 320. The MUX format represents the functional relationship between a data rate and an information source. Once the data rate is determined, the number of TUs for one PLP is determined. The MUX format is then determined according to the number and levels of information sources that constitute the TUs for the present PLP. In step 330, the QM controller 100 determines a QM set according to the number of the information sources and a QM value according to the number of TUs referring to a QM value look-up table akin to Table 2. While the determination criteria are implementation-dependent, the weight for a QCCH having a deteriorated transmission performance can be compensated by calculating the level difference between information sources for TUs or the transmission probability of each TU. After determining a QM value in step 330, the QM controller 100 generates weights corresponding to the QM value for QCCHs and feeds the weights to the QMs 43 in step 340. Then, the QMs 43 generate symbols of an appropriate size by repetition and puncturing based on the weights. In step 350, the QM controller 100 transmits the QM value and the bits of a QM field shown in Table 2 to a forward receiver on the QMI channel 203.

In the case of retransmission, the QM controller 100 checks the positions and number of corrupted TUs in step 321 and determines whether to assign weights that were determined for initial service connection or to assign the same weight in step 331. If the same weight is to be used, the QM controller generates the same weight for all QCCHs in step 342 and transmits a QM value representing that all QCCHs have the same weight to the forward receiver in step 350. On the other hand, if the same weight is not used in step 331, the QM controller 100 regenerates the weights in step 341 and transmits a QMvalue related with the weights to the forward receiver in step 350.

Steps 330 and 340 and steps 341 to 342 will be later described in more detail referring to FIGS. 5A, 5B and 5C.

Figure 4:
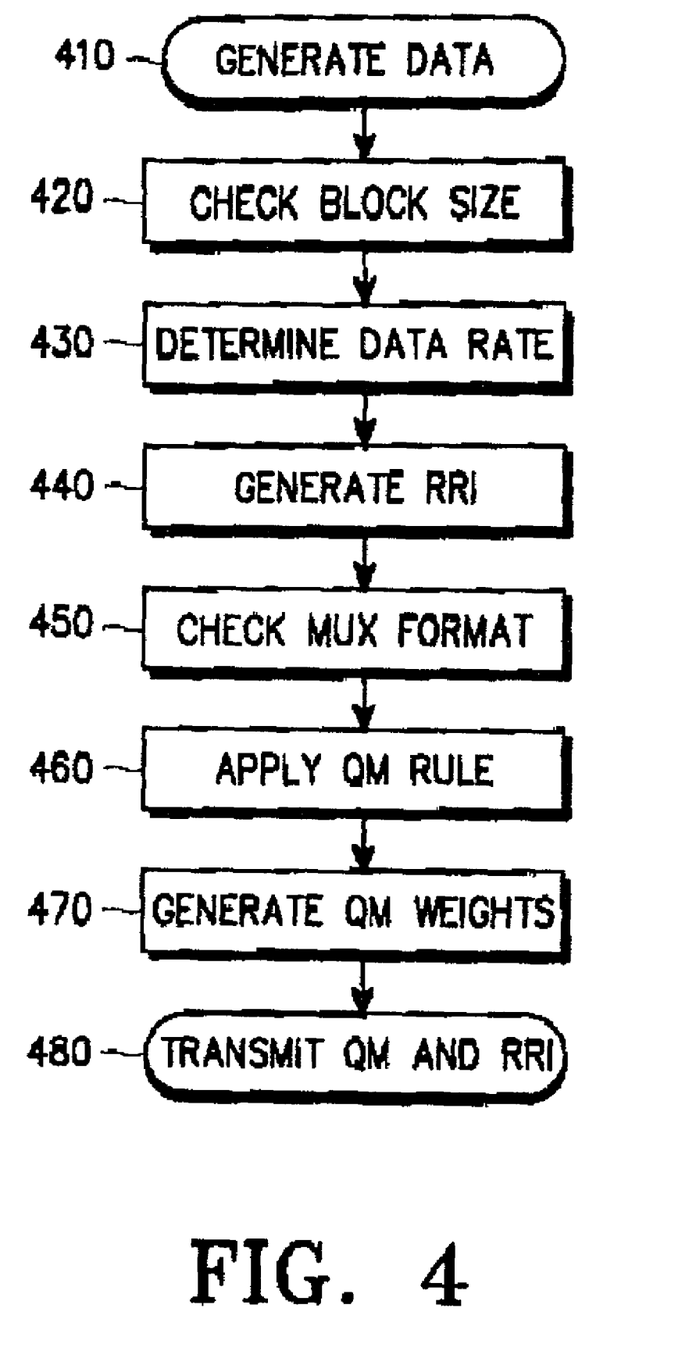
FIG. 4 is a flowchart illustrating a method of determining a QM and an RRI (Reverse Rate Indicator) for a reverse supplementary channel and transmitting the QM and RRI to a receiver.

FIG. is a flowchart illustrating the operation of determining a QM value and an RRI(Reverse Rate Indicator) for a reverse supplemental channel and transmitting them to a forward receiver according to an embodiment of the present invention.

In reverse transmission, a data rate is variable depending on the amount of generated data and the size of data blocks is also variable unlike forward transmission.

Since reverse QM must support data blocks of different sizes, more QM combinations than in forward QM are required. When data blocks of different sizes are generated in step 410, a reverse transmitter checks the block sizes in step 420. This is because a data rate is determined by a data block size. In step 430, another factor to determine the data rate, that is, an RAI (Reverse Activity Indicator) is checked. If the RAI is 0, the reverse data rate can be increased by twice when necessary and if the RAI is 1, the reverse data rate may be decreased by half in some cases. When the data rate is determined in step 430, an RRI indicating the data rate is generated in step 440. In step 450, a MUX format is checked together with the data rate. A QM level is determined in step 460 as in step 330 of FIG. 3, appropriate weights are generated and assigned to QM values for QCCHs in step 470, and the RRI and QM value are transmitted to the forward receiver on a corresponding channel in step 480. In the next reverse QM, different QM sets can also be applied to different application services and assigned in a service negotiation procedure as in the forward QM.

Figure 5A:
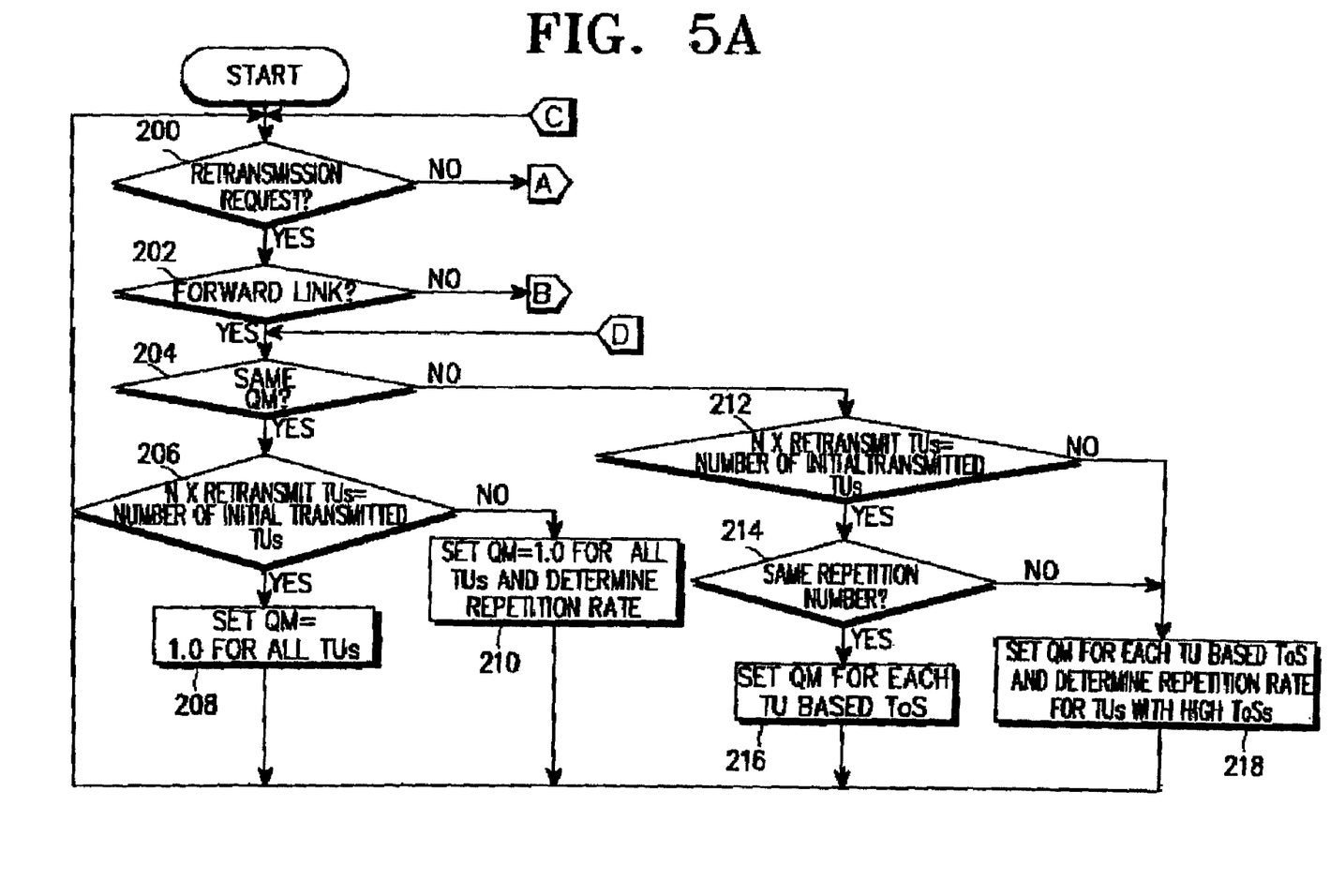
FIGS. 5A, 5B and 5C are flowcharts illustrating a control operation for providing a high rate packet data service according to an embodiment of the present invention.
Figure 5B:
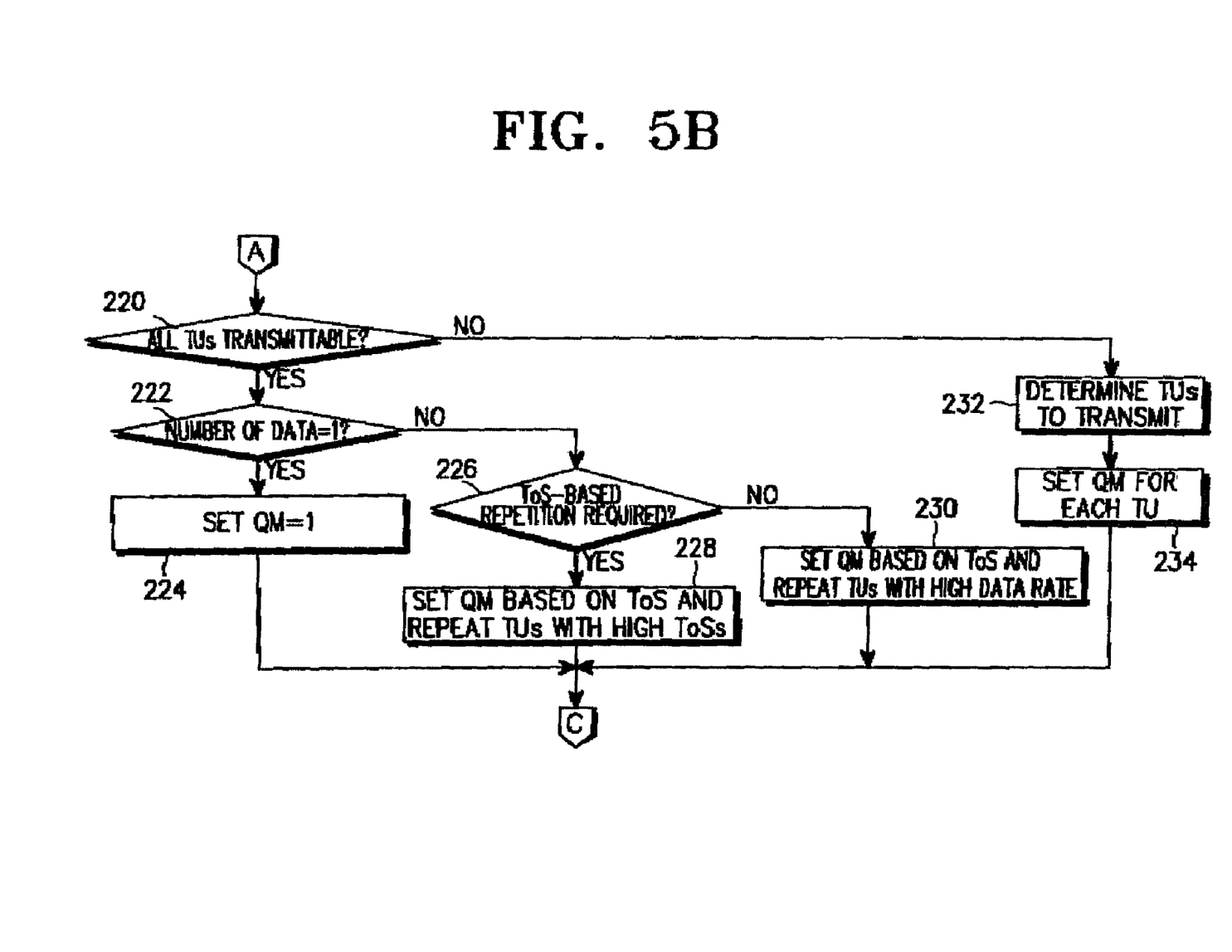
Figure 5C:
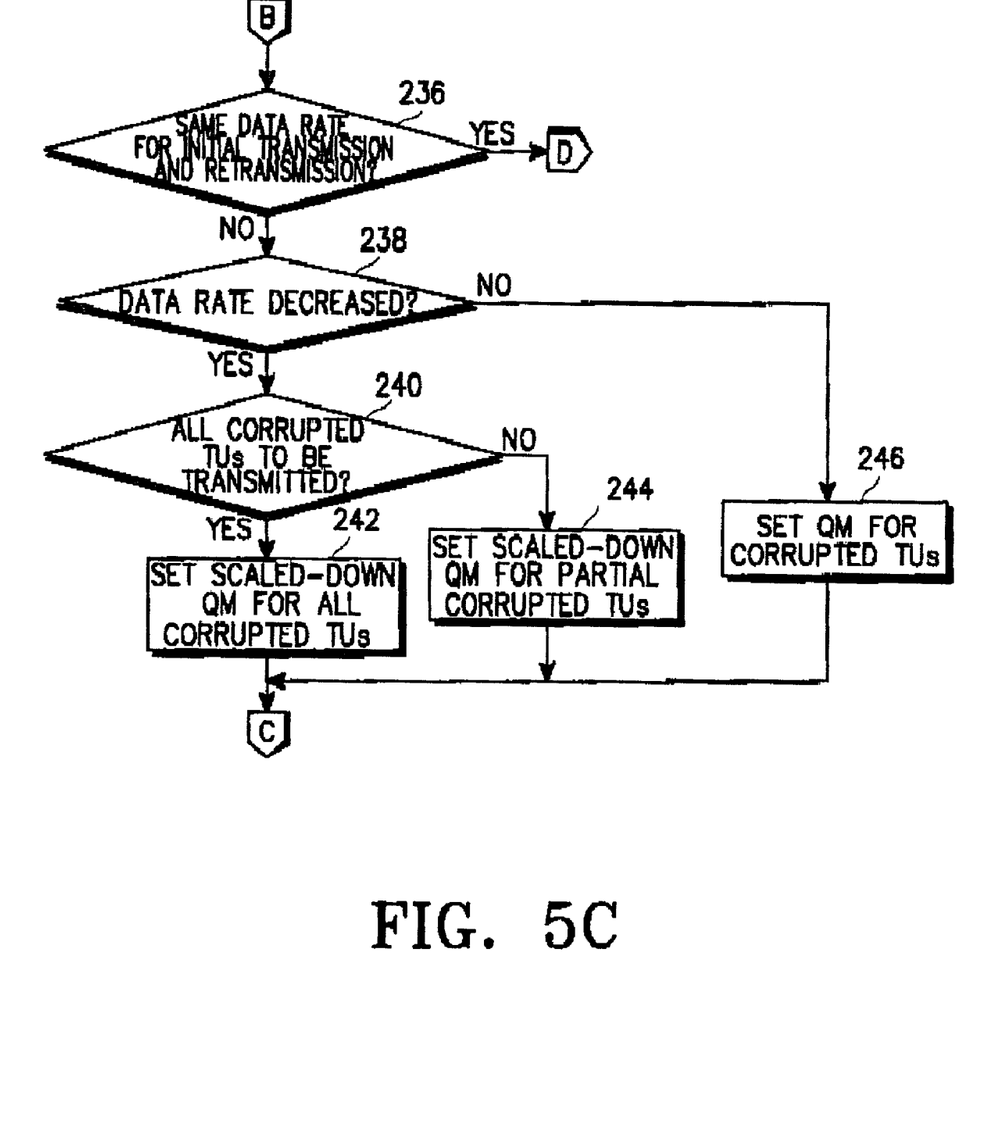

FIGS. 5A, 5B, and 5C are flowcharts illustrating a control operation for providing a high rate packet data service according to an embodiment of the present invention.

Referring to FIGS. 5A, 5B, and 5C, the QM controller 100 checks whether a retransmission request has been received from the higher layer in step 200. Upon receipt of the retransmission request, the QM controller 100 goes to step 202, but if an initial transmission occurs or transmission continues, the QM controller 100 goes to step 220.

In step 220, the QM controller 100 checks whether all TUs can be transmitted. This implies that if four TUs exist, four or less TUs have data. If all TU data can be transmitted, the QM controller 100 goes to step 222 and otherwise, it goes to step 232. The QM controller 100 checks whether the number of TUs to be transmitted is 1 in step 222. That is, one information source is to be transmitted and the source information is mapped to one TU, or a plurality of information sources are mapped to one TU. If the transmission data is mapped to one TU, the QM controller 100 sets the QM value of the TU to 1.0 and feeds the QM value to a corresponding QM 43 in step 224.

If two or more TUs are to be transmitted in step 222, the QM controller 100 checks whether TUs with high ToSs (Types of Service) must be repeated in step 226. If the ToS-based repetition is required, the QM controller 100 goes to step 228 and otherwise, it goes to step 230. In step 228, the QM controller 100 determines the QM values of the TUs based on their ToSs and determines a repetition time for TUs with high ToSs. The QoSs are set using pre-mapped data shown in Table 2 according to the rule illustrated in Table 1.

If the ToS-based TU repetition is not required in step 226, the QM controller 100 determines the QM values of the TUs based on the their ToSs using pre-mapped data shown in Table 2 according to the rule illustrated in Table 1 and repeats TUs with high data rates in step 230. If data is stored in a buffer beyond its threshold, step 230 is selected and otherwise, step 228 is selected. The buffer threshold may not be applied, or the higher layer can predetermine the buffer threshold, or the two steps can be incorporated into one step. These are implementation-dependent.

If all TUs cannot be transmitted in step 220, the QM controller 100 determines which TUs to transmit according to the data rate in step 232 and selects a QM value for each of the TUs to be transmitted in step 234. The QM value can be determined on the basis of ToS using pre-mapped data shown in Table 2 according to the rule illustrated in Table 1.

Meanwhile, if retransmission is requested in step 200, the QM controller 100 determines whether the present transmission is directed in the forward direction in step 202. The transmission direction can be preset to the forward or reverse direction beforehand when setting hardware or the device. Alternatively, the device can be configured to perform one flowchart to accommodate each transmission direction, that is, to operate in the forward or reverse direction only. While this is implementation-dependent, the flowchart in the embodiment of the present invention accommodates bidirectional transmission.

For forward transmission, the QM controller 100 proceeds to step 204, and for reverse transmission, the QM controller 100 goes to step 236. The QM controller 100 checks whether all TUs are to be transmitted with the same QM value by checking an NACK message in step 204. If all TUs are to be transmitted with the same QM value, the QM controller 100 goes to step 206 and otherwise, it goes to step 212. In step 206, the QM controller 100 determines whether the number of TUs transmitted until the NACK message reception time is an integer-multiple of the number of TUs to be retransmitted. This step is necessary because data must be retransmitted in the same structure as that of a corrupted frame. If it is an integer-multiple in step 206, the QM controller 100 sets the QM values of all the TUs to 1.0 in step 208. In step 210, the QM controller 100 sets the QM value of all the TUs to 1.0, determines the repetition time of TUs with higher ToSs, and transmits the QM values and the repetition time to the QMs 43.

If the same QM value is not applied to all the TUs in step 204, the QM controller 100 determines whether the number of TUs transmitted until the NACK message reception time is an integer-multiple of the number of TUs to be retransmitted in step 212. If it is an integer-multiple, the QM controller 100 goes to step 214, and otherwise, it goes to step 218. In step 214, the QM controller 100 determines whether the corrupted TUs can be repeated the same number of times. If the same repetition time can be applied to the corrupted TUs, the QM controller 100 in step 216 sets a QM value for each of the TUs based on its ToS, that is, sets a QoS for a TU with a high priority level.

On the other hand, if the same repetition time is not applicable to the corrupted TUs, the QM controller 100 in Step 218 sets a QM value for each of the TUs and then determines a higher repetition time for a TU with a higher ToS, that is, a higher priority level. The forward retransmission has been described so far and now reverse retransmission will be described below.

For reverse retransmission, the QM controller 100 proceeds from step 202 to step 236. In step 236, the QM controller 100 determines whether a data rate for initial transmission is the same as that for retransmission because they can be different in reverse transmission. If the data rates are the same, the QM controller 100 goes to step 204. If they are different, the QM controller 100 determines whether the data rate for retransmission is reduced from that of the initial transmission in step 238. If the data rate is decreased, the QM controller 100 goes to step 240, and if the data rate is increased, it goes to step 246. In step 246, the QM controller 100 sets a repetition time for each of the corrupted TUs, which is the same as or different from that for initial transmission.

If the data rate is decreased, the QM controller 100 determines whether all the corrupted TUs are to be retransmitted in step 240. If all the corrupted TUs are to be retransmitted, the QM controller 100 performs step 242. All the corrupted TUs are not retransmitted in the case of a non-real time data service such as Internet data service. In step 242, the QM controller 100 sets a QM value scaled down at a predetermined rate for the corrupted TUs, that is, all retransmitted data are scaled-down to a narrower band. On the other hand, if it is not necessary to transmit all the corrupted TUs, the QM controller 100 transmits part of the corrupted TUs using the scaled-down QM value in step 244. If only a few corrupted TUs are to be transmitted, the data scale-down may be unnecessary. That is, since all the data are not transmitted, a scale-down rate is determined according to the retransmitted data and the present channel condition.

As described above, the present invention controls QoSs between interservices, intermedias, and intramedias according to the number, data rate, and repetition time of data to be transmitted in a communication system for radio packet data services. Therefore, QoS control for initial transmission and retransmission increases QoSs and retransmission on a QOS control basis increases throughput.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A protocol implementing device in a mobile communication system, compnsing:
    an RLP (Radio Link Protocol) layer for receiving data with different qualities of service (QoSs) and dividing the data into datagrams according to the QoSs;
    a MUX (Multiplexing) layer for multiplexing the datagrams received from the RLP layer and outputting multiplexed data in a transport unit (TU);
    a plurality of QCCHs (Quality Control Channels) for receiving the multiplexed TU data and outputting TU blocks with the QoSs by puncturing and repeating information added according to the QoSs for the multiplexed TU data; and
    an MQC (Multiple Quality Controller) for mapping the TU blocks received on the QCCHs according to the QoSs.

2. The protocol implementing device of claim 1, wherein, the MQC further comprises:
    an encoder for encoding the TU blocks;
    a redundancy selector for providing identical or different redundancy to the encoded data depending on whether initial transmission or retransmission is performed;
    a quality matcher (QM) for performing quality matching on the redundancy-added data according to the QoSs of the data; and
    a quality matching controller (QM controller) for controlling the redundancy selector and the QM.

3. A method of transmitting data with different QoSs (Qualities of Service) in a mobile communication system, comprising the steps of:
    (1) receiving data with different QoSs and dividing the data into datagrams according to the QoSs in an RLP (Radio Link Protocol) layer;
    (2) multiplexing the datagrams received from the RLP layer and outputting multiplexed TU (Transport Unit) data in a MUX layer;
    (3) receiving the multiplexed TU data and outputting TU blocks with the QoSs by puncturing and repeating information added according to quality matcher (QM) values for the multiplexed TU data in a plurality of QCCHs (Quality Control Channels); and
    (4) mapping the TU blocks received on the QCCHs according to the QoSs in an MQC (Multiple Quality Controller).

4. The method of claim 3, wherein if all the TU blocks can be transmitted in initial transmission and the number of TU blocks to be transmitted is 1, a quality matcher (QM) value is set 1 for the TU block in step (4).

5. The method of claim 3, wherein if all the TU blocks can be transmitted in initial transmission and the number of TU blocks to be transmitted is at least 2, step (4) comprises the steps of:
    determining whether repetition is required for TUs with high ToSs (Types of Service); and
    repeating the TUs and determining the QM value according to the ToSs of the TUs if the ToS-based repetition is required.

6. The method of claim 5, wherein if the ToS-based repetition is not required, determining the QM value according to the ToSs of the TUs and repeating the TUs needed for a high data rate.

7. The method of claim 3, wherein if all the TU blocks cannot be transmitted in initial transmission, step (4) comprises the step of determining which TUs are to be transmitted and determining QM values for the determined TUs.

8. The method of claim 3, wherein if retransmission in a forward direction is requested and the same QM value is assigned to all TU blocks, step (4) comprises the steps of:
    determining whether a number of initially transmitted TU blocks is an integer-multiple of a number of TU blocks to be retransmitted; and
    setting the same QM value for the TUs to be retransmitted if the number of initially transmitted TU blocks is an integer-multiple of the number of TU blocks to be retransmitted.

9. The method of claim 8, wherein if the number of initially transmitted TU blocks is not an integer-multiple of the number of TU blocks to be retransmitted, step (4) further comprises the step of determining a repetition of the TUs to be retransmitted according to the ToSs (Types of Service) of the retransmitted TUs.

10. The method of claim 3, wherein if retransmission in a forward direction is requested and different QM values are assigned to TU blocks, the step (4) comprises the steps of:
    determining whether a number of initially transmitted TU blocks is an integer-multiple of a number of TU blocks to be retransmitted; and
    setting QM values according to a Type of Service (ToS) of the TUs and repeating the TUs needed for a high ToS if the number of initially transmitted TU blocks is not an integer-multiple of the number of TU blocks to be retransmitted.

11. The method of claim 10, wherein if the number of initially transmitted TU blocks is an integer-multiple of the number of TU blocks to be retransmitted, setting QM values according the ToS of the TUs.

12. The method of claim 3, wherein if retransmission in a reverse direction is requested and the same QM value is assigned to all TU blocks, step (4) comprises the steps of:

determining whether a number of initially transmitted TU blocks is an integer-multiple of a number of TU blocks to be retransmitted; and setting the same QM value for the TUs to be retransmitted if the number of initially transmitted TU blocks is an integer-multiple of the number of TU blocks to be retransmitted.

13. The method of claim 12, wherein if the number of initially transmitted TU blocks is not an integer-multiple of the number of TU blocks to be retransmitted, step (4) further comprises the step of determining a repetition of the TUs to be retransmitted according to the ToSs (Types of Service) of the retransmitted TUs.

14. The method of claim 12, wherein if different QM values are assigned to the TU blocks, step (4) further comprises the steps of:

determining whether the number of initially transmitted TU blocks is an integer-multiple of the number of TU blocks to be retransmitted; and setting QM values according to a type of Service (ToS) of the TUs and repeating the TUs needed to the high ToS if the number of initially transmitted TU blocks is not an integer-multiple of the number of TU blocks to be retransmitted.

15. The method of claim 3, wherein if a retransmission in a reverse direction is requested for corrupted TUs and a data rate for an initial transmission of TUs is different from a data rate for retransmission, step (4) comprises the steps of:

determining whether the data rate is decreased;

if the data rate is decreased determining whether all corrupted TUs must be retransmitted;

setting a scaled-down QM value for all the corrupted TUs if all the failed TUs must be retransmitted; and setting a scaled-down QM value for corrupted TUs to be transmitted if all the corrupted TUs are not retransmitted.

16. The method of claim 3, wherein if the data rate for an initial transmission of TUs is different from a data rate for retransmission, step (4) comprises the step of:

setting a scaled-down QM value for all the corrupted TUs.

* * * * *

UNITED STATES PATENT AND TRADEMARK OFFICE
CERTIFICATE OF CORRECTION

| | |
|---|---|
| PATENT NO. | : 7,068,627 B2 |
| APPLICATION NO. | : 09/999228 |
| DATED | : June 27, 2006 |
| INVENTOR(S) | : Chang-Hoi Koo et al. |

It is certified that error appears in the above-identified patent and that said Letters Patent is hereby corrected as shown below:

Col. 1
Title page, (75) Inventors:

Chang-Hol Koo should be Chang-Hoi Koo.

Signed and Sealed this

Third Day of October, 2006

JON W. DUDAS
*Director of the United States Patent and Trademark Office*